(12) United States Patent
Oyabu (10) Patent No.: US 10,086,581 B2
(45) Date of Patent: Oct. 2, 2018

(54) CARBON FIBER COMPOSITE MATERIAL

(71) Applicant: INOAC CORPORATION, Nagoya-shi, Aichi (JP)

(72) Inventor: Jun Oyabu, Nagoya (JP)

(73) Assignee: INOAC CORPORATION, Nagoya-shi, Aichi (JP)

( * ) Notice: Subject to any disclaimer, the term of this patent is extended or adjusted under 35 U.S.C. 154(b) by 8 days.

(21) Appl. No.: 14/899,904

(22) PCT Filed: Apr. 20, 2015

(86) PCT No.: PCT/JP2015/061970
§ 371 (c)(1),
(2) Date: Dec. 18, 2015

(87) PCT Pub. No.: WO2015/178141
PCT Pub. Date: Nov. 26, 2015

(65) Prior Publication Data
US 2016/0136922 A1 May 19, 2016

(30) Foreign Application Priority Data
May 21, 2014 (JP) .................. 2014-105477

(51) Int. Cl.
*B32B 3/30* (2006.01)
*B32B 3/26* (2006.01)
(Continued)

(52) U.S. Cl.
CPC .............. *B32B 3/30* (2013.01); *B29C 43/021* (2013.01); *B29C 43/20* (2013.01); *B29C 70/06* (2013.01);
(Continued)

(58) Field of Classification Search
CPC .... B32B 3/30; B32B 3/26; B32B 5/18; B32B 27/065; B32B 5/24; B32B 5/245;
(Continued)

(56) References Cited

U.S. PATENT DOCUMENTS 4,250,136 A 2/1981 Rex
5,406,723 A * 4/1995 Okajima ............... A43B 5/049
36/131

(Continued)

FOREIGN PATENT DOCUMENTS

CN 102309820 A 1/2012
DE 102004004548 A 8/2005
(Continued)

OTHER PUBLICATIONS

Extended European Search Report (EESR) dated Jan. 3, 2018, from the European Patent Office in counterpart European Application No. 15796498.2.

*Primary Examiner* — Catherine A Simone
(74) *Attorney, Agent, or Firm* — Sughrue Mion, PLLC (57) ABSTRACT

Surfaces of a carbon-fiber composite material is constructed by a carbon fiber prepregs by arranging a porous prepreg between the carbon fiber prepregs, at least one of a concave portion and a convex portion is formed on at least one surface of the carbon composite material, and, as compared to a normal portion without the concave portion and the convex portion, a thickness of the porous prepreg at the concave portion is reduced and a thickness of the porous prepreg at the convex portion is increased.

9 Claims, 5 Drawing Sheets

(51) Int. Cl.
*B32B 5/18* (2006.01)
*B29C 43/20* (2006.01)
*B29C 70/06* (2006.01)
*B29C 70/34* (2006.01)
*B29C 43/02* (2006.01)
*B32B 27/06* (2006.01)
*B32B 27/42* (2006.01)
*B29K 105/08* (2006.01)

(52) U.S. Cl.
CPC ............... *B29C 70/345* (2013.01); *B32B 3/26* (2013.01); *B32B 5/18* (2013.01); *B32B 27/065* (2013.01); *B32B 27/42* (2013.01); *B29C 2043/022* (2013.01); *B29K 2105/0872* (2013.01); *B32B 2260/023* (2013.01); *B32B 2260/046* (2013.01); *B32B 2262/106* (2013.01); *B32B 2266/0285* (2013.01); *B32B 2266/06* (2013.01); *B32B 2535/00* (2013.01)

(58) Field of Classification Search
CPC ....... B32B 5/28; B32B 5/26; B32B 2260/023; B32B 2262/106; B32B 2305/022; B32B 38/08; B29C 70/34; B29C 70/345; B29C 70/342; B29C 70/36; B29C 70/40; B29C 70/086; B29C 70/467; Y10T 428/24479; Y10T 428/249953; Y10T 428/249955; Y10T 428/249958
See application file for complete search history.

(56) References Cited

U.S. PATENT DOCUMENTS 6,451,231 B1  9/2002  Harrison et al.
2011/0293914 A1*  12/2011  Maurer ................. B29C 44/569
                                                     428/304.4
2012/0237754 A1  9/2012  Kasuga et al.

FOREIGN PATENT DOCUMENTS

| EP | 0695626 A3 | 6/1996 |
| EP | 1015216 | 7/2000 |
| EP | 1 046 666 A1 | 10/2000 |
| JP | 07-243147 A | 9/1995 |
| JP | 8-276525 A | 10/1996 |
| JP | 2004-209717 A | 7/2004 |
| JP | 2008-207523 A | 9/2008 |
| JP | 2012-106461 A | 6/2012 |
| WO | 85-04620 A1 | 10/1985 |
| WO | 99/08854 A1 | 2/1999 |
| WO | 2011/052243 A1 | 5/2011 |

* cited by examiner

(2-2 SECTIONAL VIEW)

FIG.3

(ENLARGED SECTIONAL VIEW OF PART A)

FIG.6
(6-6 SECTIONAL VIEW)

FIG.7
(ENLARGED SECTIONAL VIEW OF PART B)

CARBON FIBER COMPOSITE MATERIAL

This application claims the benefit of Japanese Patent Application No. 2014-105477, filed on May 21, 2014, the entire contents of which are hereby incorporated by reference, the same as if set forth at length, the entire of which are incorporated herein by reference.

TECHNICAL FIELD

The present invention relates to a carbon fiber composite material.

BACKGROUND ART

In recent years, lightness and stiffness are required for housings of OA equipment such as laptop computers and printers, machine components, or members such as an insole of prosthetic legs. For such members, a carbon fiber-reinforced plastic has been used in which a plurality of carbon fiber prepregs obtained by impregnating carbon fibers with a resin and then semi-drying are laminated and then integrated by heating and pressing.

Figure 10:
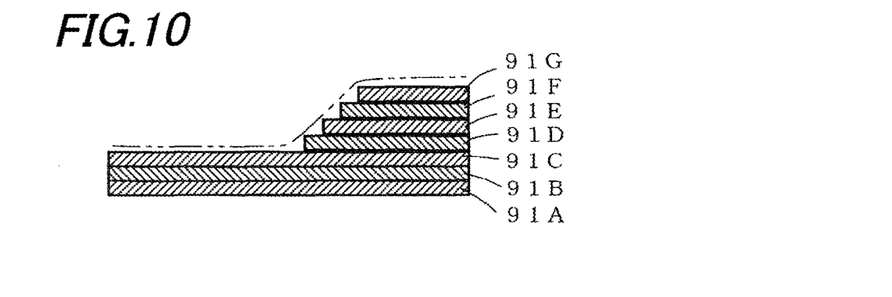
FIG. 10 is an enlarged sectional view showing convex portions formed on a carbon-fiber-reinforced plastic by laminating according to the related art.

Conventionally, in order to obtain a carbon fiber-reinforced plastic having a convex portion or a concave portion formed on a surface thereof to have different thicknesses in accordance with regions thereof, as shown in FIG. 10, the number of carbon fiber prepregs 91A to 91G needs to be varied in accordance with each of regions of different thicknesses, and also the carbon fiber prepregs need to be laminated and integrated at exaction positions. Also, in this case, the carbon fiber prepregs 91A to 91G to be laminated have to be prepared to have a number of different shapes conforming to those of regions, on which the carbon fiber prepregs are to be laminated. Therefore, because types of carbon fiber prepregs required are drastically increased to complicate both of preparation and shaping of the carbon fiber prepregs, this technique is not practical.

Figure 11:
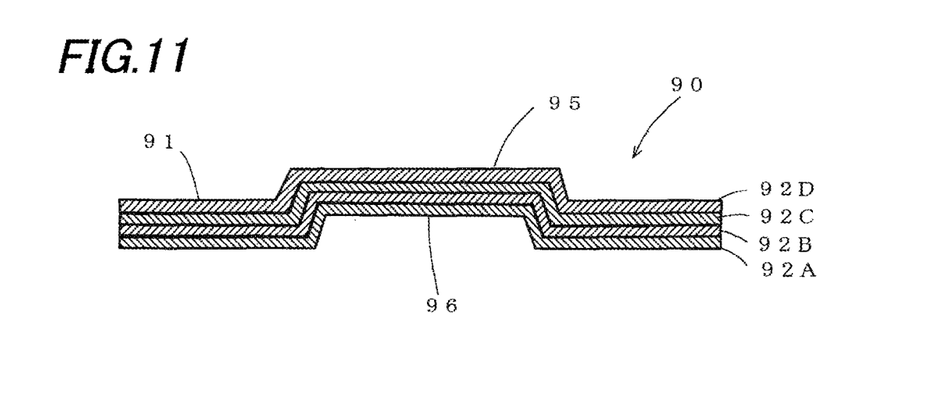
FIG. 11 is an enlarged sectional view showing a convex portion formed on a carbon-fiber-reinforced plastic by pressing according to the related art.

Further, there is a case where a plurality of carbon fiber prepregs are laminated and then pressed and heated by a pressing mold having mold surfaces previously provided with unevenness, so that the unevenness is formed on surfaces of a carbon fiber-reinforced plastic. In this case, the plurality of carbon fiber prepregs are pressed and formed by a convex portion on one mold surface and a concave portion on the other mold surface. Therefore, as shown in FIG. 11, a carbon fiber-reinforced plastic 90 made of a plurality of carbon fiber prepregs 92A, 92B, 92C and 92D is configured so that a convex portion 95 on one side thereof and a concave portion 96 on the opposite side are formed in pairs, and as a result, there are restrictions on shapes thereof. In addition, only a carbon fiber-reinforced plastic of a constant thickness, in which a normal portion 91, which does not have unevenness, the concave portion and the convex portion are all formed at the same thickness, is obtained, and thus ones whose thickness is partially varied cannot be obtained. Therefore, a degree of freedom in design is low and there are restrictions on applications thereof.

[Patent Document 1] JP-A-2012-106461
[Patent Document 2] JP-A-2004-209717
[Patent Document 3] JP-A-H07-243147

SUMMARY OF INVENTION

Technical Issue

Accordingly, the present invention has been made keeping in mind the above problem, and an object thereof is to provide a carbon fiber composite material in which relief-molding of a concave portion and a convex portion on a surface thereof can be facilitated and a degree of freedom in shape design thereof can be enhanced.

Solution to Problem

According to the present invention, the followings are provided.

(1) A carbon fiber composite material is characterized by including: a plurality of carbon fiber prepregs made of a carbon fiber fabric impregnated with a thermosetting resin; and at least one porous prepreg made of a porous material impregnated with a thermosetting resin, the carbon fiber prepregs and the porous prepreg are laminated and integrated by heating and pressing, the porous prepreg is arranged between the carbon fiber prepregs so that surfaces of the carbon fiber composite material is constructed by the carbon fiber prepregs, at least one of a concave portion and a convex portion is formed on at least one surface of the carbon composite material, and, as compared to a normal portion without the concave portion and the convex portion, a thickness of the porous prepreg at the concave portion is reduced and a thickness of the porous prepreg at the convex portion is increased.

(2) In the carbon fiber composite material according to (1), as compared to the normal portion without the concave portion and the convex portion, a thickness of the carbon fiber composite material at the concave portion may be reduced and a thickness of the carbon fiber composite material at the convex portion may be increased.

(3) In the carbon fiber composite material according to (1) or (2), the other surface opposite to the one surface including the concave portion and the convex portion may be formed as a flat surface without unevenness.

(4) In the carbon fiber composite material according to any one of (1) to (3), the plurality of carbon fiber prepregs and the porous prepreg may be formed in the same shape as viewed in a plain view.

(5) The carbon fiber composite material according to any one of (1) to (4), a plurality of porous prepregs may be overlapped with each other and arranged between the carbon fiber prepregs.

(6) In the carbon fiber composite material according to any one of (1) to (5), the number of carbon fiber prepregs between one surface of the carbon fiber composite material and a porous prepreg nearest to the one surface may be equal to the number of carbon fiber prepregs between the other surface and a porous prepreg nearest to the other surface.

(7) The carbon fiber composite material according to any one of (1) to (5), the number of carbon fiber prepregs between one surface of the carbon fiber composite material and the porous prepreg nearest to the one surface may be different from the number of carbon fiber prepregs between the other surface and the porous prepreg nearest to the other surface.

Advantageous Effects of Invention

According to the carbon fiber composite material of (1), a thickness of the porous prepreg arranged between the plurality of carbon fiber prepregs in the carbon fiber composite material is configured to be reduced at the concave portion of the carbon fiber composite material as compared to the normal portion, which does not have unevenness, and to be increased at the convex portion thereof as compared to the normal portion. Accordingly, the carbon fiber composite material having at least one of the concave portion and the convex portion formed on the surface thereof can be obtained by arranging the porous prepreg between the plurality of carbon fiber prepregs and then performing heating and pressing thereof. Thus, it is not necessary to laminate various types of carbon fiber prepregs or porous prepregs having different shapes in order to relief-mold the concave portion and the convex portion, thereby facilitating relief-molding of unevenness and also enhancing the degree of freedom in shape design.

According to the carbon fiber composite material of (2), as compared to the normal portion, a thickness of the carbon fiber composite material at the concave portion is reduced and a thickness of the carbon fiber composite material at the convex portion is increased, thereby enhancing the degree of freedom in shape design.

According to the carbon fiber composite material of (3), the surface opposite to the concave portion and the convex portion is constructed as a flat surface which does not have unevenness. Accordingly, the surface opposite to the concave portion and the convex portion can be designed so that an influence of the concave portion and the convex portion in shape is not exerted on the flat surface, thereby enhancing the degree of freedom in shape design. For example, if the carbon fiber composite material is a component, a space in which the component is to be received can be effectively utilized without wasting the receiving space.

According to the carbon fiber composite material of (4), the plurality of carbon fiber prepregs and the porous prepreg are formed in the same shape as viewed in a plain view. Accordingly, it is not necessary to laminate various types of carbon fiber prepregs or porous prepregs having different shapes in order to relief-mold the concave portion and the convex portion. Therefore, relief-molding of unevenness can be facilitated and also dimensional variations in the product can be suppressed, thereby increasing productivity and in turn reducing work man-hours.

According to the carbon fiber composite material of (5), a plurality of porous prepregs are overlapped with each other and then arranged between the carbon fiber prepregs, thereby allowing a depth of the concave portion or a height of the convex portion to be increased.

According to the carbon fiber composite material of (6) and (7), the number of carbon fiber prepregs arranged between both surfaces of the carbon fiber composite material and the porous prepreg is varied depending on whether the concave portion and the convex portion are formed on only one surface of the carbon fiber composite material, on both surfaces thereof or the like. Accordingly, a good concave portion or convex portion can be formed and also a carbon fiber composite material free of warpage can be obtained. Also, a position to which the porous prepreg is arranged can be properly changed to control an amount of warpage.

DESCRIPTION OF EMBODIMENTS

Figure 1:
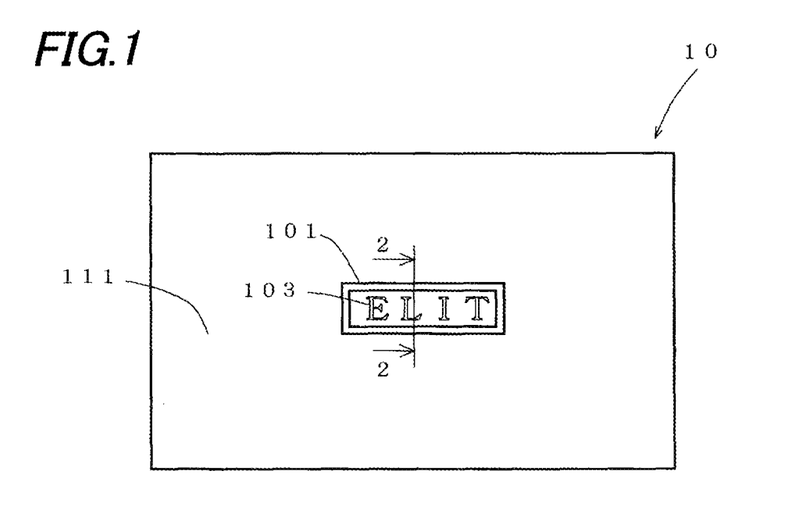
FIG. 1 is a plan view of a carbon-fiber composite material according to a first embodiment of the present invention.
Figure 2:
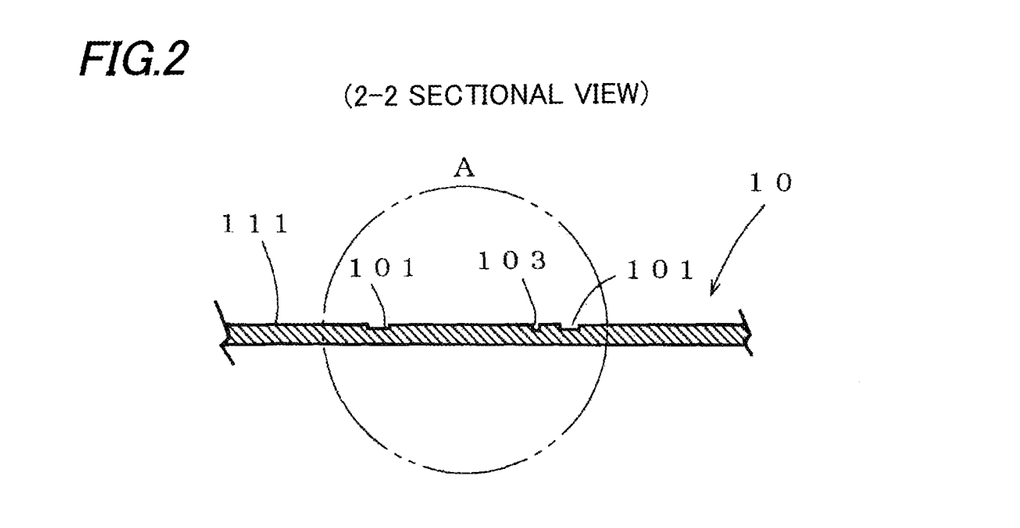
FIG. 2 is a sectional view taken along a line 2-2 of FIG. 1.
Figure 3:
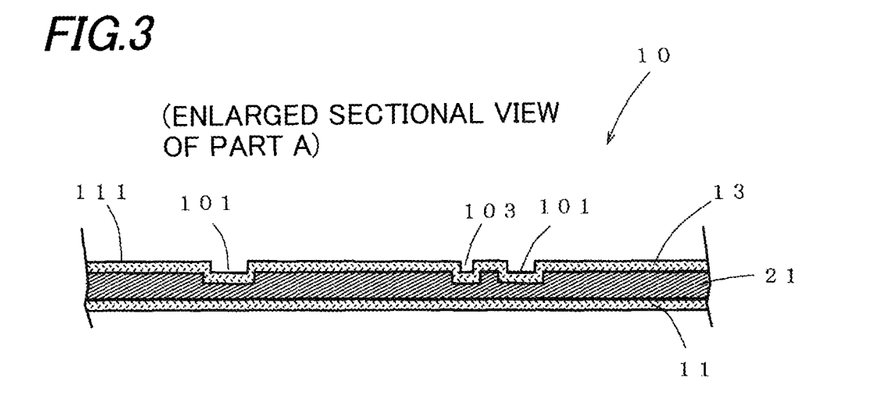
FIG. 3 is an enlarged sectional view of a part A of FIG. 2.

Now, embodiments of the present invention will be described. A carbon fiber composite material 10 of a first embodiment shown in FIG. 1 is used as an exterior plate of a cover in a housing of a laptop computer. As shown in FIGS. 2 and 3, letters constructed by concave portions 103 are formed in a portion surrounded by a frame-shaped concave portion 101 in an exterior surface of the carbon-fiber composite material 10. Meanwhile, in the concave portions 101 and 103, metal foils may be bonded or colored resins for decoration may be laminated.

The carbon-fiber composite material 10 is constructed as a laminate in which one porous prepreg 21 is arranged between two carbon fiber prepregs 11 and 13 and integrated therewith by heating and pressing. The carbon fiber prepregs 11 and 13 are made of a carbon fiber fabric impregnated with a thermosetting resin. The carbon fiber fabric is superior in lightness and high stiffness, and in particular, is preferably one whose fibers are not aligned in only one direction but are woven by weaving. For example, a plain woven fabric, a twill woven fabric and a sateen woven fabric, which are formed from warp threads and weft threads, a triaxial woven fabric, which is formed from three-way threads, and the like are suitable. Also, the carbon fiber fabric has preferably a basis weight of 50 g/m$^2$ to 600 g/m$^2$ in terms of impregnation and stiffness of the thermosetting resin.

Although the thermosetting resin to be impregnated into the carbon fiber fabric is not particularly limited, the thermosetting resin itself needs to have a certain degree of stiffness for the purpose of increasing stiffness of the carbon fiber composite material 10 and thus can be selected from a group consisting of epoxy resin, phenolic resin, and mixture of epoxy resin and phenolic resin. Also, if flame retardant is required for the carbon fiber composite material 10, a flame retardant resin is preferable as the thermosetting resin. Phenolic resin is suitable as the thermosetting resin to be impregnated into the carbon fiber fabric, because phenolic resin has a good flame retardant to reduce additives for imparting flame retardant.

Also, the thermosetting resin is preferably impregnated into the carbon fiber fabric so that a resin weight ratio in the carbon fiber prepregs is 50% to 80%, particularly 55% to 70%. By choosing such a resin ratio, better lightness and stiffness can be obtained.

The porous prepreg 21 is one in which a porous material is impregnated with a thermosetting resin. The porous material is not particularly limited and can be include a foam, a fiber product and the like. The foam can suitably include a foam having an open cell structure, and for example, can be selected from a group consisting of urethane resin foam, melamine resin foam, polyolefin (polyamide) foam and the like. Because the foam has open cells, the foam can be impregnated with a thermosetting resin and also can be shaped at a higher compression ratio. The fiber product can particularly include raw fibers, threads, piles, flock, woven fabrics, knitted fabrics, non-woven fabrics, nets, flocked fabrics and cut products thereof. By choosing such materials as the porous material, the porous material can be compressed down to a thickness of carbon fiber fabrics laminated on top of one another. In particular, melamine resin foam or polyamide resin foam is preferable as the porous material. Also, if flame retardant is required for the carbon fiber composite material 10, a flame retardant material is preferable as the porous material. Melamine resin foam is suitable as the porous material because melamine resin foam has a good flame retardant. An initial thickness of the porous material prior to compression is properly set and for example, may be 1 to 25 mm. Also, when the porous material is made of a foam, the foam preferably has a density of 5 to 80 kg/m³ prior to compression in terms of ease of compression, impregnating ability, lightness and stiffness.

Although the thermosetting resin to be impregnated into the porous material is not particularly limited, the thermosetting resin itself needs to have a certain degree of stiffness for the purpose of increasing stiffness of the carbon fiber composite material 10 and thus can be selected from a group consisting of epoxy resin, phenolic resin, and mixture of epoxy resin and phenolic resin. Also, if flame retardant is required for the carbon fiber composite material 10, a flame retardant resin is preferable as the thermosetting resin. Phenolic resin is suitable as the thermosetting resin to be impregnated into the porous material because phenolic resin has a good flame retardant. Further, the thermosetting resin to be impregnated into the porous prepreg and the thermosetting resin to be impregnated into the carbon fiber prepregs are preferably the same, thereby increasing adhesion therebetween and thus significantly reducing occurrence of delamination.

The carbon fiber composite material 10 has the frame-shaped concave portion 101 and the letter-shaped concave portions 103 formed on one surface thereof, which corresponds to the exterior side. At locations of the concave portions 101 and 103, the porous prepreg 21 are largely compressed as compared to a normal portion 111 which does not have concave portions and convex portions, so that a thickness of the porous prepreg 21 is reduced and thus a thickness of the carbon fiber composite material 10 is reduced. Also, the opposite surface at the locations of the concave portions 101 and 103 is constructed as a flat surface which does not have unevenness.

The carbon fiber prepregs 11 and 13 and the porous prepreg 21 have the same shape as viewed in a plan view. Meanwhile, the numbers of the carbon fiber prepregs and the porous prepreg to be laminated are properly set depending on use and required strength of the carbon fiber composite material. Incidentally, the symbol portion constituted of the frame-shaped and letter-shaped concave portions in FIG. 1 has a size of 30 mm×100 mm in width and length and a depth of the concave portions is 0.5 mm.

Figure 4:
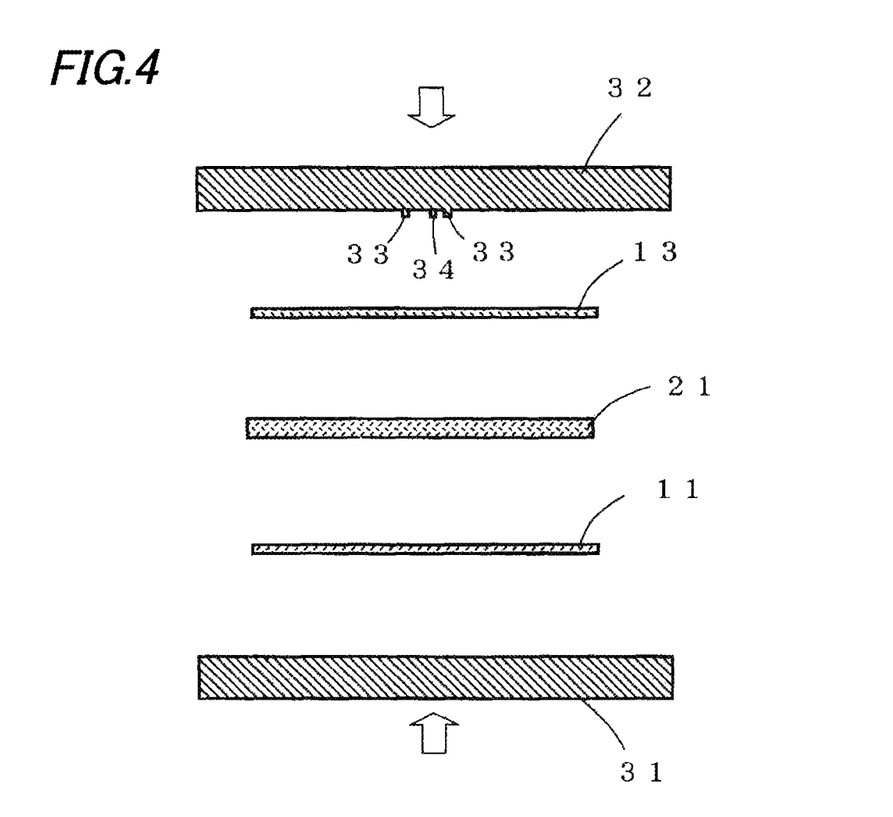
FIG. 4 is a schematic sectional view showing an apparatus used when shaping the carbon-fiber composite material of the first embodiment.

One example of a method of shaping the carbon fiber composite material 10 of the first embodiment will be now described. As shown in FIG. 4, the carbon fiber prepreg 11, the porous prepreg 21 and the carbon fiber prepreg 13 prior to curing are laminated in this order between a lower pressing mold 31 and an upper pressing mold 32, which has concave portion-forming projections 33 and 34 formed on a mold surface thereof. Then, the lower pressing mold 31 and the upper pressing mold 32 are approached to each other to press and heat the carbon fiber prepreg 11, the porous prepreg 21 and the carbon fiber prepreg 13 in the laminated state. The lower pressing mold 31 and the upper pressing mold 32 are heated at a temperature, at which the thermosetting resins can be cured, using a heating means such as an electric heater.

When the carbon fiber prepregs 11 and 13 and the porous prepreg 21 are pressed and heated by the lower pressing mold 31 and the upper pressing mold 32, the concave portions 101 and 103 are formed in regions thereof pressed by the concave portion-forming projections 33 and 34. In this state, the thermosetting resins impregnated into the carbon fiber prepregs 11 and 13 and the porous prepreg 21 are cured so that the carbon fiber prepregs 11 and 13 and the porous prepreg 21 are integrated with each other and are fixed in shape, thereby obtaining the carbon fiber composite material 10.

Figure 5:
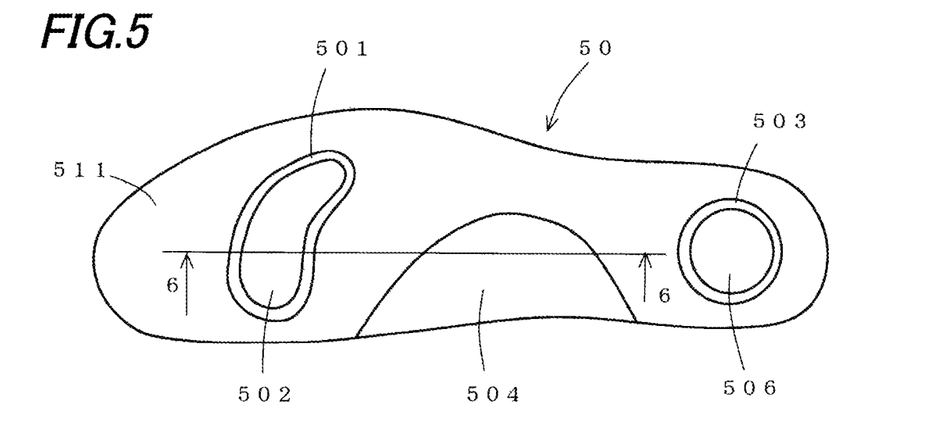
FIG. 5 is a plan view of a carbon-fiber composite material according to a second embodiment of the present invention.
Figure 6:
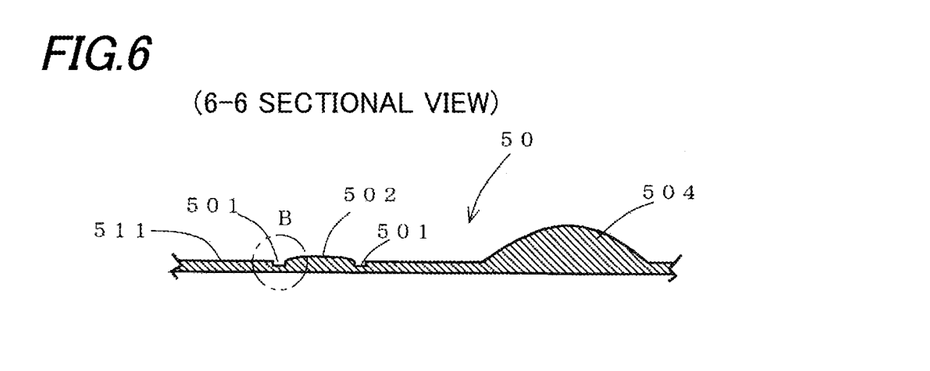
FIG. 6 is a sectional view taken along a line 6-6 of FIG. 5.
Figure 7:
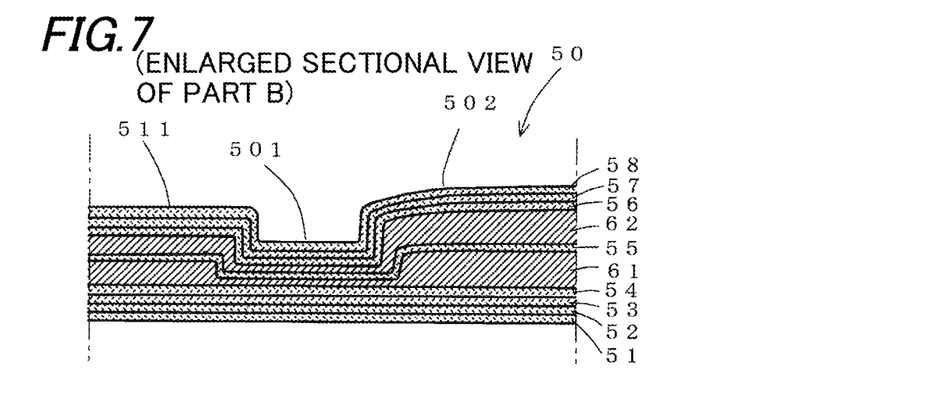
FIG. 7 is an enlarged sectional view of a part B of FIG. 6.

A carbon fiber composite material 50 of a second embodiment shown in FIG. 5 is used as an insole of a prosthetic leg. As shown in FIGS. 6 and 7, concave portions 501 and 503 and convex portions 502, 504 and 506 are formed in regions corresponding to the vicinity of a base of toes, an arch portion of the foot and a heel portion.

The carbon fiber composite material 50 is constructed as a ten-layered laminate having carbon fiber prepregs 51, 52, 53 and 54, a porous prepreg 61, a carbon fiber prepreg 55, a porous prepreg 62 and a carbon fiber prepreg 56, 57 and 58 laminated in this order from the lowest layer on a back side thereof and integrated by heating and pressing. The carbon fiber prepregs 51 to 58 and the porous prepregs 61 and 62 of the second embodiment have the same configurations as those of the carbon fiber prepregs 11 and 13 and the porous prepreg 21 of the first embodiment.

Three carbon fiber prepregs exist between a surface, on which the concave portions 501 and 503 and the convex portions 502, 504 and 506 are formed, and the porous prepreg 62 nearest to the surface. In contrast, four carbon fiber prepregs exist between the opposite surface, on which there are no concave portion and convex portion, and the porous prepreg 61 nearest to the surface. Namely, the porous prepreg 62 is arranged close to the concave portions and convex portions. Due to this arrangement, relief-molding of the concave portions and convex portions can be facilitated.

At locations of the concave portions 501 and 503, the porous prepregs 61 and 62 are largely compressed as compared to a normal portion 511 which does not have concave portions and convex portions, so that thicknesses of the porous prepregs are reduced and thus a thickness of the carbon fiber composite material 50 is reduced. On the other hand, at locations of the convex portions 502, 504 and 506, amounts of compression of the porous prepregs 61 and 62 are small as compared to the normal portion 511 which does not have concave portions and convex portions, so that thicknesses of the porous prepregs are increased and thus a thickness of the carbon fiber composite material 50 is also increased. Also, the opposite surface at the locations of the concave portions 501 and 503 and the convex portions 502, 504 and 506 is constructed as a flat surface which does not have unevenness.

Such a plurality of carbon fiber prepregs 51 to 58 and porous prepregs 61 and 62 have the same shape as viewed in a plan view. Also, the numbers of the carbon fiber prepregs and the porous prepregs to be laminated are properly set depending on use and required strength of the carbon fiber composite material.

Figure 8:
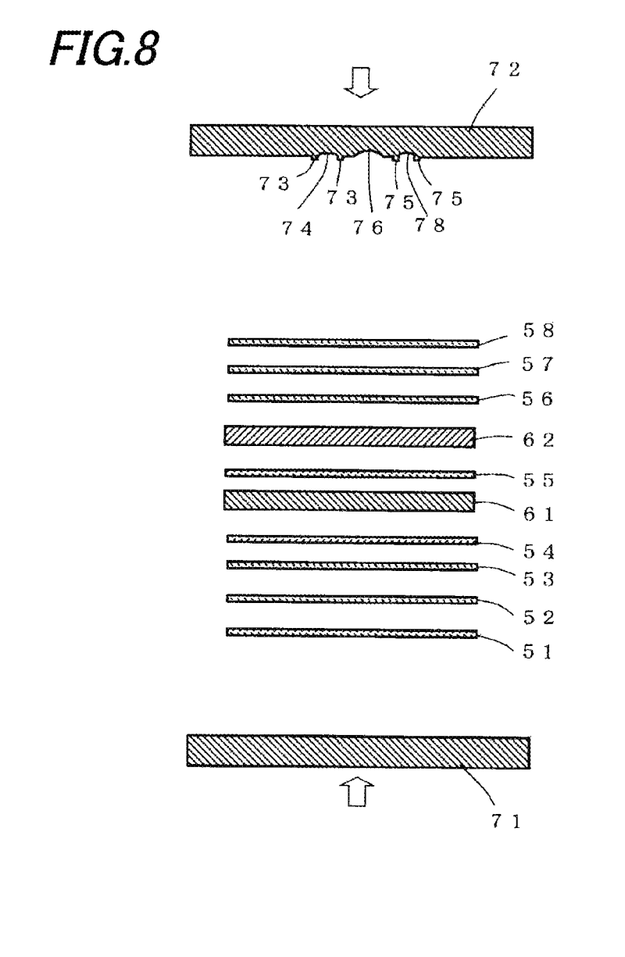
FIG. 8 is a schematic sectional view showing an apparatus used when shaping the carbon-fiber composite material of the second embodiment.

One example of a method of shaping the carbon fiber composite material 50 of the second embodiment will be now described. As shown in FIG. 8, the carbon fiber prepregs 51, 52, 53 and 54, the porous prepreg 61, the carbon fiber prepreg 55, the porous prepreg 62 and the carbon fiber prepregs 56, 57 and 58 prior to curing are laminated in this order between a lower pressing mold 71 and an upper pressing mold 72, which has concave portion-forming projections 73 and 75 and convex portion-forming concave portions 74, 76 and 78 formed on a mold surface thereof. Then, the lower pressing mold 71 and the upper pressing mold 72 are approached to each other to press and heat the carbon fiber prepregs and the porous prepregs in the laminated state. The lower pressing 71 and the upper pressing mold 72 are heated at a temperature, at which the thermosetting resins can be cured, using a heating means such as an electric heater.

When the carbon fiber prepregs and the porous prepregs are pressed and heated by the lower pressing mold 71 and the upper pressing mold 72, the concave portions 501 and 503 are formed in regions thereof pressed by the concave portion-forming projections 73 and 75. In addition the convex portions 502, 504 and 506 are formed in regions abutted to the concave portions 74, 76 and 78. In this state, the thermosetting resins impregnated into the carbon fiber prepregs 51 to 56 and the porous prepregs 61 and 62 are cured so that the carbon fiber prepregs 51 to 56 and the porous prepregs 61 and 62 are integrated with each other and are fixed in shape, thereby obtaining the carbon fiber composite material 50.

Figure 9:
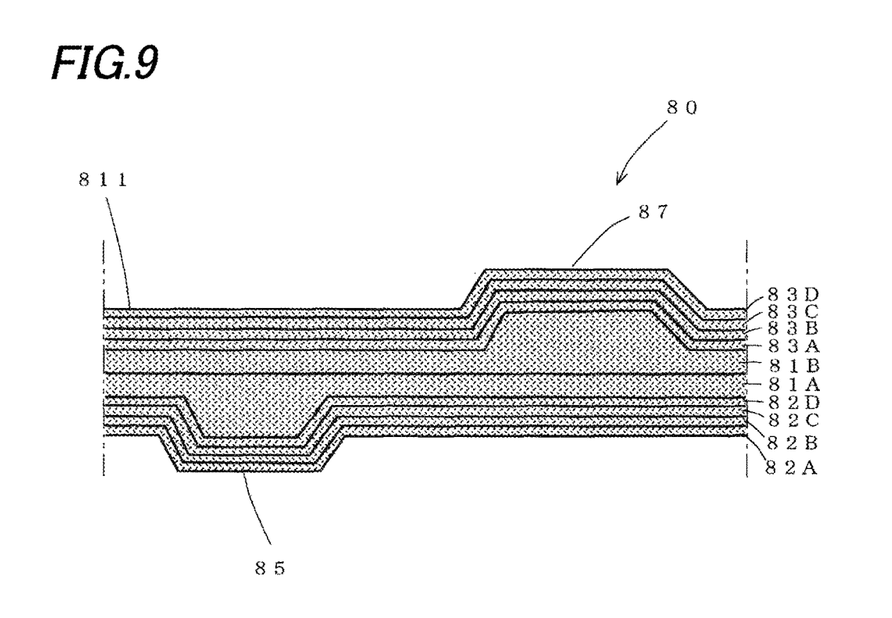
FIG. 9 is an enlarged sectional view showing a part of a carbon-fiber composite material according to a third embodiment of the present invention.

FIG. 9 enlargedly shows a part of a carbon fiber composite material 80 of a third embodiment having a different lamination structure. The carbon fiber composite material 80 is constructed as a ten-layered laminate, in which two porous prepregs 81A and 82B are overlapped with each other and then four carbon fiber prepregs 82A, 82B, 82C and 82D; 83A, 83B, 83C and 83D are laminated on each of both sides thereof and integrated by pressing and heating. Convex portions 85 and 87 are formed on both surfaces of the carbon fiber composite material 80. The carbon fiber prepregs 82A to 82D and 83A to 83D and the porous prepregs 81A and 81B of the third embodiment have the same configurations as those of the carbon fiber prepregs 11 and 13 and the porous prepreg 21 of the first embodiment.

In the carbon fiber composite material 80, four carbon fiber prepregs 82A to 82D exist between one surface thereof, on which the convex portion 85 is formed, and the porous prepreg 81A nearest to the surface. Four carbon fiber prepregs 83A to 83D exist between the opposite surface, on which the convex portion 87 is formed, and the porous prepreg 81B nearest to the surface. Namely, four carbon fiber prepregs exist on each surface side. Due to this arrangement, relief-molding of the convex portions 85 and 87 on both surfaces can be facilitated.

At locations of the convex portions 85 and 87, amounts of compression of the porous prepregs 81A and 81B are small as compared to a normal portion 811 which does not have concave portions and convex portions, so that thicknesses of the porous prepregs 81A and 81B are increased and thus a thickness of the carbon fiber composite material 80 is also increased. Also, the opposite surface at the locations of the convex portions 85 and 87 is constructed as a flat surface, on which there is no unevenness.

Such a plurality of carbon fiber prepregs 82A to 82D and 83A to 83D and porous prepregs 81A and 81B have the same shape as viewed in a plan view. Also, the numbers of the carbon fiber prepregs and the porous prepregs to be laminated are properly set depending on use and required strength of the carbon fiber composite material.

EXAMPLES

Example 1

An example of shaping the carbon fiber composite material 10 of FIG. 1 will be now described. A phenolic resin (a mixture of PAPS-4, a trade name, produced by Asahi Organic Chemicals Industry Co. Ltd., and Hexamethylenetetramine, a trade name, produced by Asahi Organic Chemicals Industry Co. Ltd. at a ratio of 100:12) as the thermosetting resins was dissolved in methanol at a concentration of 30 wt %. In this phenolic resin solution, a plain woven carbon fiber fabric (W-3101, a trade name, produced by Toho Tenax Co. Ltd. and having a basis weight of 200 g/m$^2$) as the fiber fabric was immersed. After taking out of the solution, the carbon fiber fabric was naturally dried for 2 hours at room temperature of 25° C. and then further dried for 1 hour under an atmosphere of 60° C., thereby forming two sheets of carbon fiber prepregs. As the carbon fiber fabric, one which has been cut to a plane size of 200×300 mm (a weight of 12 g per sheet) was used.

Also, a melamine resin foam (Basotect V3012, a trade name, produced by BASF and having a density of 9 kg/m$^3$), which has been cut to a thickness of 10 mm and a plane size of 200×300 mm (a weight of 5.4 g), as a foam having an open cell structure, was immersed in the phenolic resin solution in the same manner as in the case of the carbon fiber fabric. After taking out of the solution, the resin foam was naturally dried for 2 hours at room temperature of 25° C. and then further dried for 1 hour under an atmosphere of 60° C., thereby forming one sheet of porous prepreg.

Then, the carbon fiber prepregs and the porous prepreg were laminated and heated on upper and lower shaping molds having cavities, thereby obtaining the carbon fiber composite material. Specifically, the carbon fiber prepregs and the porous prepreg were laminated and arranged on the cavity of the lower mold made of SUS, of which surface had been previously applied with a mold release agent, in the lamination order shown in FIG. 4, i.e., in the order of the carbon fiber prepreg, the porous prepreg and the carbon fiber prepreg. Subsequently, the laminate on the lower mold was pressed by the upper mold, which has the concave portion-forming projections formed on the mold surface thereof, at 180° C. for 3 minutes with a surface pressure of 5 MPa, so that the laminate was compressed and heated and the phenolic resin was reacted and cured in the compressed state. At this time, heating was performed by cast-in heaters attached on the upper and lower molds. A thickness after compressing is set by designing the cavities to correspond to that of the normal portion which defines a flat plate depending on a shape of the product. Subsequently, the lower and upper molds were cooled at room temperature and then were opened. As a result, the carbon fiber composite material 10 of FIG. 1 in which the carbon fiber prepregs and the porous prepreg are laminated and integrated was obtained.

Example 2

An example of shaping the carbon fiber composite material 50 of FIG. 5 will be now described. Eight sheets of carbon fiber prepregs and two sheets of porous prepregs were formed in the same manner as in Example 1. Then, the carbon fiber prepregs and the porous prepregs were successively laminated and arranged on a cavity of the lower mold made of SUS, of which surface had been previously applied with a mold release agent, in the lamination order shown in FIG. 8. Subsequently, the laminate on the lower mold was pressed by the upper mold, which has the concave portion-forming projections and the convex portion-forming concave portions formed on the mold surface thereof, at 180° C. for 3 minutes with a surface pressure of 5 MPa, so that the laminate was compressed and heated and the phenolic resin was reacted and cured in the compressed state. At this time, heating was performed by cast-in heaters attached on the upper and lower molds. A thickness after compressing is set by designing the cavities to correspond to that of the normal portion which defines a flat plate depending on a shape of the product. Subsequently, the lower and upper molds were cooled at room temperature and then were opened. As a result, the carbon fiber composite material in which the carbon fiber prepregs and the porous prepregs are laminated and integrated was obtained. Then, extra portions of the periphery of the carbon fiber composite material were cut and trimmed, thereby obtaining the carbon fiber composite material 50 of FIG. 5.

As described above, according to the present invention, it is not necessary to laminate various types of carbon fiber prepregs or porous prepregs having different shapes in order to relief-mold concave portions and convex portions, thereby facilitating relief-molding of unevenness and also enhancing a degree of freedom in shape design.

By referring to the present specification and drawings, various variants can be conceived. According to teachings of the specification, the present invention includes the followings.

The plurality of carbon fiber prepregs and porous prepregs are not limited to the case where they have the same shape as viewed in a plan view. Accordingly, depending on shapes of products to be shaped, planar shapes of the two types of prepregs may be cut and designed in accordance with lamination positions thereof. In particular, shapes of the porous prepregs as viewed in a plan view may be cut and designed in accordance with lamination positions thereof.

This application is based on Japanese Patent Application No. 2014-105477 filed on May 21, 2014, the entire contents of which are incorporated herein by reference.

According to the present invention, a carbon fiber composite material having at least one of concave portions and convex portions formed on a surface thereof can be obtained by arranging a porous prepreg between a plurality of carbon fiber prepregs and then performing heating and pressing thereof. Thus, it is not necessary to laminate various types of carbon fiber prepregs or porous prepregs having different shapes in order to relief-mold such concave portions and convex portions, thereby facilitating relief-molding of unevenness and also enhancing a degree of freedom in shape design.

10, 50, 80 carbon fiber composite material
11, 13, 51 through 58, 82A through 82D, 83A through 83D carbon fiber prepreg
21, 61, 62, 81A, 81B porous prepreg
101, 103, 501, 503 concave portion
502, 504, 506, 85, 87 convex portion
111, 511, 811 normal portion

What is claimed is:
1. A carbon fiber composite material comprising:
a plurality of carbon fiber prepregs made of a carbon fiber fabric impregnated with a thermosetting resin; and
at least one porous prepreg made of a porous material impregnated with a thermosetting resin,
wherein the carbon fiber prepregs and the porous prepreg are laminated and integrated by heating and pressing,
wherein the porous prepreg is arranged between the carbon fiber prepregs so that surfaces of the carbon fiber composite material is constructed by the carbon fiber prepregs,
wherein at least one concave portion and at least one convex portion are formed on at least one surface of the carbon composite material,
wherein, as compared to a normal portion without the concave portion and the convex portion, a thickness of the porous prepreg at the concave portion is reduced and a thickness of the porous prepreg at the convex portion is increased,
wherein a plurality of porous prepregs are overlapped with each other and arranged between the carbon fiber prepregs, and
the plurality of porous prepregs are formed of a foam having an open cell structure.
2. The carbon fiber composite material according to claim 1,
wherein as compared to the normal portion without the concave portion and the convex portion, a thickness of the carbon fiber composite material at the concave portion is reduced and a thickness of the carbon fiber composite material at the convex portion is increased.
3. The carbon fiber composite material according to claim 1
wherein the concave portion and the convex portion are formed on one surface, and the other surface opposite to the one surface including the concave portion and the convex portion is formed as a flat surface without unevenness.
4. The carbon fiber composite material according to claim 1
wherein the plurality of carbon fiber prepregs and the porous prepreg are formed in the same shape as viewed in a plain view.
5. The carbon fiber composite material according to claim 1
wherein the number of carbon fiber prepregs between one surface of the carbon fiber composite material and a porous prepreg nearest to the one surface is equal to the number of carbon fiber prepregs between the other surface and a porous prepreg nearest to the other surface.
6. The carbon fiber composite material according to claim 1,
wherein the plurality of porous prepregs are formed of a urethane resin foam.
7. The carbon fiber composite material according to claim 1,
wherein the plurality of porous prepregs are formed of a melamine resin foam.
8. A carbon fiber composite material comprising:
a plurality of carbon fiber prepregs made of a carbon fiber impregnated with a thermosetting resin; and
at least one porous prepreg made of a porous material impregnated with a thermosetting resin,
wherein the carbon fiber prepregs and the porous prepreg are laminated and integrated by heating and pressing,
wherein the porous prepreg is arranged between the carbon fiber prepregs so that surfaces of the carbon fiber composite material is constructed by the carbon fiber prepregs, wherein at least one concave portion and at least one convex portion are formed on at least one surface of the carbon composite material, wherein, as compared to a normal portion without the concave portion and the convex portion, a thickness of the porous prepreg at the concave portion is reduced and a thickness of the porous prepreg at the convex portion is increased, and wherein the number of carbon fiber prepregs between one surface of the carbon fiber composite material and the porous prepreg nearest to the one surface is different from the number of carbon fiber prepregs between the other surface and the porous prepreg nearest to the other surface.

9. A carbon fiber composite material comprising:

a first carbon fiber prepreg that is formed as one surface of the carbon fiber composite material;

a second carbon fiber prepreg that is formed as the other surface of the carbon fiber composite material;

at least one porous prepreg that is formed between the first and second carbon fiber prepregs; and thermosetting resin that fixes the first carbon fiber prepreg, the second carbon fiber prepreg and the porous prepreg, wherein at least one concave portion is formed on at least one of the one surface and the other surface, at least one convex portion is formed on at least one of the one surface and the other surface, in the at least one concave portion, a concave part is formed in the porous prepreg, the at least one convex portion is formed by pressing a surrounding area of the convex portion in the porous prepreg, wherein, as compared to a normal portion without the concave portion and the convex portion, a thickness of the porous prepreg at the concave portion is reduced and a thickness of the porous prepreg at the convex portion is increased, wherein a plurality of porous prepregs are overlapped with each other and arranged between the carbon fiber prepregs, and the plurality of porous prepregs are formed of a foam having an open cell structure.

* * * * *